June 29, 1965 T. D. READER 3,191,836
TAPE FEEDING APPARATUS
Filed Oct. 10, 1962 2 Sheets-Sheet 1

INVENTOR
TREVOR DRAKE READER
BY Edward M. Hassell
ATTORNEY 3,191,836

TAPE FEEDING APPARATUS

Trevor Drake Reader, Wayne, Pa., assignor to Sperry Rand Corporation, New York, N.Y., a corporation of Delaware Filed Oct. 10, 1962, Ser. No. 229,703

3 Claims. (Cl. 226—118)

This invention relates to tape feeding apparatus and particularly to the type of tape feeding apparatus which has found widespread usage in digital computer equipment. More particularly, this invention relates to a new and novel means for providing increased tape storage capacity for vacuum loop boxes of the type used to store buffer loops of tape between the drive capstan and the storage reels of a tape feeding apparatus.

The well known type of tape feeding apparatus with which this invention is concerned utilizes a supply reel and a take-up reel as means for storing the tape at both ends of the system with a drive capstan for controlling the rate of feed of the tape past a transducer head. In tape feeding apparatus of this type, it has been necessary as the art has developed to provide an increased capacity for the storage means which must be provided between each reel and the capstan to accommodate the disparity in the acceleration rates of the reels as compared with the capstan. This is particularly the case when start up and stopping times must be minimized thus requiring extremely high acceleration rates of the capstan which acceleration rates the heavy tape reels cannot approach with reasonably sized driving motors.

The necessity for maintaining the loop boxes of the tape feeding apparatus as small as possible in order to make units themselves as compact as possible necessitates a limitation of the length of the loop box which can be utilized when they are of the standard straight construction.

It is an object of the present invention to provide increased storage capacity for tape storage means of the vacuum loop box type.

A still further object of the present invention is to provide a high capacity vacuum loop box for storing a folded tape loop for each of the reels of a tape feeding apparatus.

A still further object of the present invention is to provide a high capacity vacuum loop tape storage means capable of utilizing a portion of the storage means for storing either the loop between the capstan and the take-up reel or the loop between the capstan and the supply reel.

In carrying out the above objects the present invention utilizes storage means for buffer lengths of tape in a system for feeding tape between reels which storage means comprises separate first loop boxes for each reel for receiving through an open end thereof a separate loop of tape extending between each of said tape reels and an interposed tape drive means. Associated with each of the first loop boxes a second loop box is provided. The second loop boxes are in communication with an end of each of the first loop boxes opposite its open end so as to provide a change in direction of the tape loops as they move from the first loop boxes to the second loop boxes. The respective second loop boxes are arranged to communicate with each other at their other ends, that is, the ends away from the areas of communication associated with the first loop boxes. In the region of communication between each of loop boxes means are provided for exposing that region to a source of reduced air pressure so that each tape loop is maintained taut as long as the ends of their respective loops are not in the same loop box.

The present invention will be clearly understood in its several embodiments when reference is made to the accompanying description in conjunction with the drawings, in which.

Figures 1, 1A, 2:
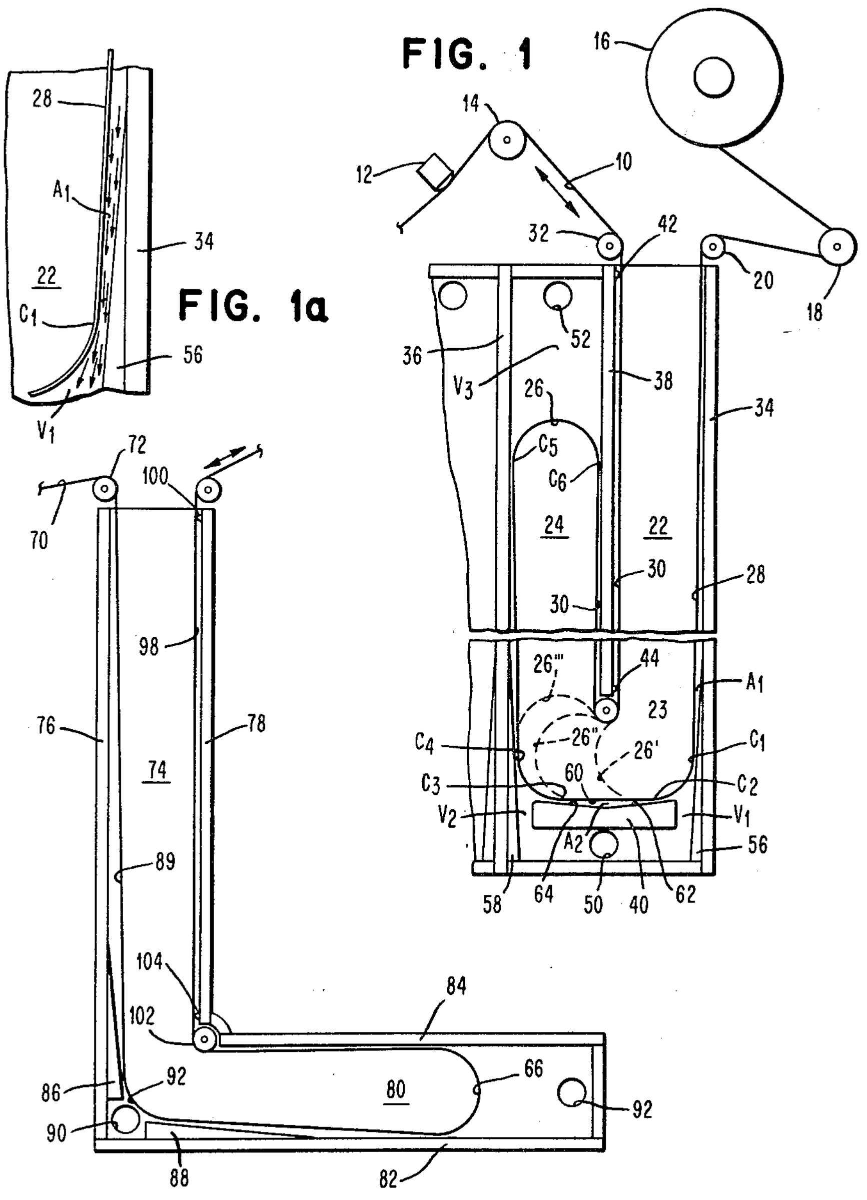
FIGURE 1 is a partial view of one embodiment of the novel tape storage means.
FIGURE 1A is a partial view showing the relationship of the tape loop side and the guiding surface in one section of FIGURE 1.
FIGURE 2 is a complete view of a modified form of the novel tape storage means.

Referring to FIGURE 1, the magnetic tape 10 is transported past a transducer 12 which may be a common type of magnetic head where the tape 10 is of the type utilized for recording information in the form of magnetic spots. The tape 10 may be transported in either direction by the capstan 14 with the velocity of the tape at all times being maintained by the speed of the capstan 14. The tape 10 is fed from or to reel 16 which may be either a take-up or a supply reel in the full tape feeding system of which FIGURE 1 is only a partial view. The feed from reel 16 leads around idler pulley 18 and idler roller 20 into the open end of a first vacuum loop box 22 and thence into a second vacuum loop box 24 where the loop is formed at end portion 26, and thence the tape goes back around a substantially frictionless bearing means, such as roller 23, into loop box 22. The loop of tape is thus completed with the arcuate end portion 26 between the outside portion of the loop 28 and the inside portion 30. After completing the loop the tape goes over idler roller 32 to capstan 14 and then past transducer head 12.

In FIGURE 1, the first and second vacuum loop boxes are formed by opposing side walls 34 and 36 in conjunction with the partition 38 disposed between the opposing side walls 34 and 36 and extending only part way to the end wall 40 to form the other side walls of the representative loop boxes. The partition 38 has a projection of generally triangular cross section affixed at each of its ends on the side facing into loop box 22. These triangular projections are shown in FIGURE 1 as 42 and 44 at the top and bottom, respectively, of the partitions 38.

Vacuum loop box 22 communicates with vacuum loop box 24 at the end opposite its open end. This region of communication may be considered as that region in boxes 22 and 24 lying beyond the end of partition 38. This region of communication is connected to a source of reduced air pressure at aperture 50 located on the other side of the tape loop from an end wall 40 which is transverse to partition 38 and opposite and spaced from its end.

The upper end of loop box 24 is also connected to a source of reduced air pressure at aperture 52. The introduction of the reduced air pressure at apertures 50 and 52 serves to pull the loop along its path in the loop boxes and to maintain the loop of tape in boxes 22 and 24 taut so as to maintain the integrity of the loop regardless of the position of the end 26 of the loop in the boxes 22 and 24.

With loop boxes such as 22 and 24 constructed in rectangular form as shown in FIGURE 1, it is necessary in addition to an introduction of a specially contoured end wall 40 to also introduce a first wedge 56 and a second wedge 58 so that the outer portion of the tape loop, namely length 28, is guided as the loop end 26 turns the corner where the box 22 communicates with 24. The contour of the end wall 40 and the wedges 56 and 58 also serve to maintain the outer portion 28 free from adherence to walls 34 and 36 and end wall 40 as well as the wedges themselves.

In operation of the storage means of FIGURE 1 the loop end 26 is fed into the open end of tape loop box 22 by a counterclockwise rotation of reel 16 or by a clockwise rotation of capstan 14. The end 26 of the tape loop is drawn lengthwise of the loop box 22 by the pressure difference across the tape resulting from the reduced air pressure supplied at aperture 50. The outer portion 28 of the loop is maintained out of extensive surface contact with the side wall 34 and inner portion 26 is also free from adherence to the partition 38 by virtue of the positioning of the idler pulleys 20 and 32 as well as by virtue of the triangular projections 42 and 44.

It has been found desirable in the feeding of tape loops into vacuum loop boxes to maintain a certain relationship between the side of the loop of tape and the surface guiding the loop. This relationship is best illustrated by reference to FIGURE 1A. In FIGURE 1A the angle the tape loop side 28 makes with the guiding surface of wedge 56 in the tape loop box 22 is preferably maintained at a value between 1° and 10°. This angle is exaggerated in FIGURE 1A for purposes of illustration. The angular relationship of the tape to the guiding surface when in the range of 1° to 10° prevents surface contact between the tape and the guiding surface by allowing a flow of air to be maintained between the region $A_1$, which is at atmospheric pressure and the region $V_1$ which is at a reduced pressure. The air flow past the point $C_1$ at which the tape most closely approaches the guiding surface of wedge 56 is effective to prevent adherence of the tape to the surface. If this relationship between the loop side and the guiding surface is maintained and if the regions between the tape and the guiding surfaces are alternately atmospheric and reduced pressure between consecutive points at which the tape approaches the guiding surface then a stable loop can be maintained without adhering contact between the tape and the guiding surface. It has been found that the high velocity of air flow in this region, where the tape is closest to the loop box side, is such that a reduced pressure results and the tape is held very close to the wall but out of contact therewith. This relationship between the tape loop side, loop box wall and reduced air pressure source provides stability of the tape loop. Thus, there is provided a basic principle which can be followed in the design of all of the surface contours in the various modifications of the vacuum loop boxes here described as well as other modifications which will be obvious to those skilled in the art.

As the end 26 of the tape loop approaches the area of communication between the vacuum loop box 22 and loop box 24 the outer side of the loop 28 is maintained at the desired angle to the side wall by the insertion of the wedge 56 which in conjunction with the initial portion of the side wall 34 forms over its entire surface a non-planar area. This is the case since the surface exposed by the wedge 56 and that exposed by the inner portion of the side wall 34 although they are themselves plane surfaces, taken together they form a surface which over is full extent is non-planar in nature. The wedge 56 is thus found desirable since the length of the loop box 22 may be such that as the end 26 of the tape loop approaches the region of communication between the boxes 22 and 24 the outer portion 28 of the loop takes an angle to the wall 34 which becomes less and less as the length of the loop increases. The wedge 56 prevents this angle from becoming too small and thus helps prevent adherence of the tape to the wall 34.

As the loop becomes still longer the end 26 takes up the position shown as 26′ with that portion of the tape loop lying between the end wall 40 and the wedge 56 assumes a curvature with the same radius as the end 26′ because of its exposure in the region $V_1$ to a reduced air pressure provided at aperture 50. In this position there is an air flow from the area designated $A_1$ which at atmospheric pressure to the area $V_1$ past the point at which the tape loop side 28 approaches the wedge 56 namely at $C_1$. This air flow, as mentioned before, maintains the area labelled $C_1$ close to but spaced from wedge 56.

As the tape loop lengthens still further it takes a position 26″ with the tape then approaching the guiding surfaces, namely the surface of wedge 56 and end wall 40 at the desired small angle in three different places, namely $C_1$, $C_2$ and $C_3$, with a vacuum existing at $V_1$ and at $V_2$ on both sides of end wall 40. That portion of the tape which lies across the surface of end wall 40; namely, portion 60, is a straight portion even though the guiding surface of the end wall 40 is non-planar overall by virtue of the two intersecting planar surfaces 62 and 64, for atmospheric pressure will exist in the region $A_2$ as well as on the other side of tape portion 60. There is then no difference in pressure across the tap in that region and it will thus lie along a straight path. The atmospheric pressure in region $A_2$ exists because of the flow of air from the opposite side of portion 60 around the edge of the tape along the back face and the front face of the loop box as allowed by the fact that the width of tape 10 is somewhat less than the depth of the tape loop boxes.

As the tape loop extends still further into loop box 24, it may take the position shown as 26‴. The tape loop then approaches the guiding surface of wedge 56 and wall 40 and wedge 58 at the points $C_1$, $C_2$, $C_3$ and $C_4$. In this position the contour of the tape over the region $V_1$ maintains the same radius as the loop end 26‴ and area of the other region exposed to the reduced air pressure or the other side of end wall 40, namely $V_2$, likewise maintains the same radius as end 26‴ for similar reasons. It may thus be evident that the reduced air pressure provided at aperture 50 tends to maintain the integrity of the loop, that is, it does not allow it to collapse even though the loop has turned the corner between box 22 and box 24.

As the loop turns the corner the triangular projection 44 serves to maintain the inner portion 30 of the loop away from the partition 38 and prevent tape from being drawn into the region between the roller 23 and the end section of the partition 38. The inner portion 30 then goes around the roller 23 which is provided as a substantially frictionless bearing surface for the tape end.

As the tape enters loop box 24, it approaches the partition wall in loop box 24 at the previously mentioned desirable small angle. Thus, as the loop extends completely into the loop box 24 with the loop having the desirable maximum length the inner portion 30 approaches the partition wall 38 at the point $C_6$ while the outer portion 28 of the loop approaches the guiding surfaces and walls of the loop box at the points $C_1$, $C_2$, $C_3$, $C_4$ and $C_5$ with all of the surfaces being so arranged that the angle at which the tape approaches them is maintained between 1° and 10° so that atmospheric pressure can exist at $A_1$, $A_2$ and $A_3$ while the vacuum is maintained at $V_1$, $V_2$ and $V_3$.

While the side 34 of loop box 22 in conjunction with the wedge 56 forms a non-planar surface as may be desirable to maintain the small angle of approach between the tape and the side of the loop box, the surfaces 62 and 64 as well as that provided by wedge 58 in conjunction with the surface of loop box 24 on the side 36 form non-planar surfaces when taken as a wohle. These non-planar surfaces have as their function the avoidance of close adhering contact with the tape. The non-planar nature of these surfaces accomplishes this result by allowing at atmospheric pressure region such as $A_2$ and $A_3$ to form between each pair of points at which the tape approaches a surface and where it is not exposed to reduced air pressure. It can thus be seen that it is necessary, in order to follow the principle previously outlined in describing FIGURE 1A, that the outer portion of the tape as it turns the corner between the connecting vacuum loop boxes 22 and 24 should be exposed alternately to atmospheric pressure and to reduced air pressure and these regions of alternate exposure are bounded by the points at which the tape most closely approaches the guiding surfaces and it is this alternate exposure to atmospheric and reduced air pressure which makes possible the maintenance of a free loop in the folded loop box arrangement of FIGURE 1 since it prevents contact between the tape and the guiding surfaces except at the roller 23 and at the very small areas of the triangular projections 42 and 44.

It will be obvious to those skilled in the art that an arrangement such as that shown in FIGURE 1 may be constructed without the use of separate wedges 56 and 58 or a separate end wall portion 40 as shown in FIGURE 1 and it is only necessary that the guiding surface on the contoured portion of the loop box should provide the above-mentioned non-planar surface areas to establish the alternate exposure of the outside portion of the tape to atmospheric and reduced air pressure so that at each point where the tape approaches the guiding surface an air flow may be maintained to prevent adherence thereto. It will also be evident to those skilled in the art that the non-planar surface referred to above may be made up of curved surface areas rather than the planes shown in FIGURE 1.

It may be desirable to maintain as constant as possible the tension in the tape due to the vacuum loop boxes. To accomplish this the surfaces 62 and 64 may be constructed to be tangent to the circular arc which is tangent to the surfaces of the wedges 56 and 58 and centered on the roller 23. Such a construction would tend to maintain the radius or curvature of the loop end 26 more nearly constant as it goes from the position 26' to the positions 26'' and 26'''. When this radius is maintained substantially constant, the tension in the tape will also be maintained substantially constant.

In withdrawing the tape loop end 26 from the vacuum loop box 24 back into loop box 22, the turn will be accomplished in the area of communication between the two loop boxes in the same manner as mentioned above except that it will be in reverse order.

The same principles which were followed in the construction of the loop box in FIGURE 1 may be utilized to turn the loop through something less than 180°. For example, in FIGURE 2 the loop 66 is turned through 90°. In this case the tape 70 as it comes from a storage reel, for example, goes over idler roller 72 thence into the open end of first loop box 74. The first loop box is formed by the opposing walls 76 and 78. As the tape loop extends beyond the extreme end of the loop box 74, it is guided through a 90° turn into loop box 80 which is formed by opposing walls 82 and 84. At the end of the loop box 74 the surface of the wall 76 is modified to provide an overall non-planar surface by the insertion of wedge 86. Likewise, the wall 82 of the second loop box 80 is made into a non-planar surface by the insertion of wedge 88. These wedges 86 and 88 form a guiding surface which guides the outer portion 89 of the tape loop around the 90° turn.

A reduced air pressure is maintained in the region between the surface of wedge 86 and wedge 88 by connecting a source of reduced air pressure to the aperture 90 so that the length of tape 89 as it goes around the 90° turn maintains in the region 92 a radius similar to that at end 66. A source of reduced air pressure is also connected to aperture 96 at the end of loop box 80. This reduced air pressure connection pulls the tape into loop box 80 after it has extended beyond the limits of loop box 74. As is the case with the arrangement shown in FIGURE 1, the inner portion of the loop, namely portion 98, is maintained away from the side 78 by the triangular wedge 100. Similarly, the portion 98 is maintained away from the space between the frictionless bearing member 102, which is shown in the form of a roller, and wall 78 by the triangular wedge 104.

The operation of the vacuum loop box storage system of FIGURE 2 is similar to that described above with regard to FIGURE 1 in that the walls 76 and the wedge 86 taken together form a non-planar surface as does the wall 82 taken in conjunction with the wedge 88. These two non-planar surfaces are interrupted by an area exposed to a reduced air pressure; namely, that portion shown as 92. Thus, the basic principle of maintaining alternate areas along the tape loop exposed to atmospheric and reduced air pressure avoids contact between the tape loop and the guiding surface.

While arrangements such as those shown in FIGURES 1 and 2 may be utilized for each vacuum loop storage means provided in a tape feeding system, that is, for the storage means between the take-up reel and the capstan as well as the storage means between the supply reel and the capstan, it is possible to further increase the length of loop which may be stored between either of the reels and the capstan by establishing a region of communication between the second loop boxes of each of the separate storage means to thus establish the second loop boxes as storage capacity which can be considered as being common in that it may be utilized by either the loop between the take-up reel and the capstan or the loop between the supply reel and the capstan. Such an arrangement is shown in FIGURE 3.

Figure 3:
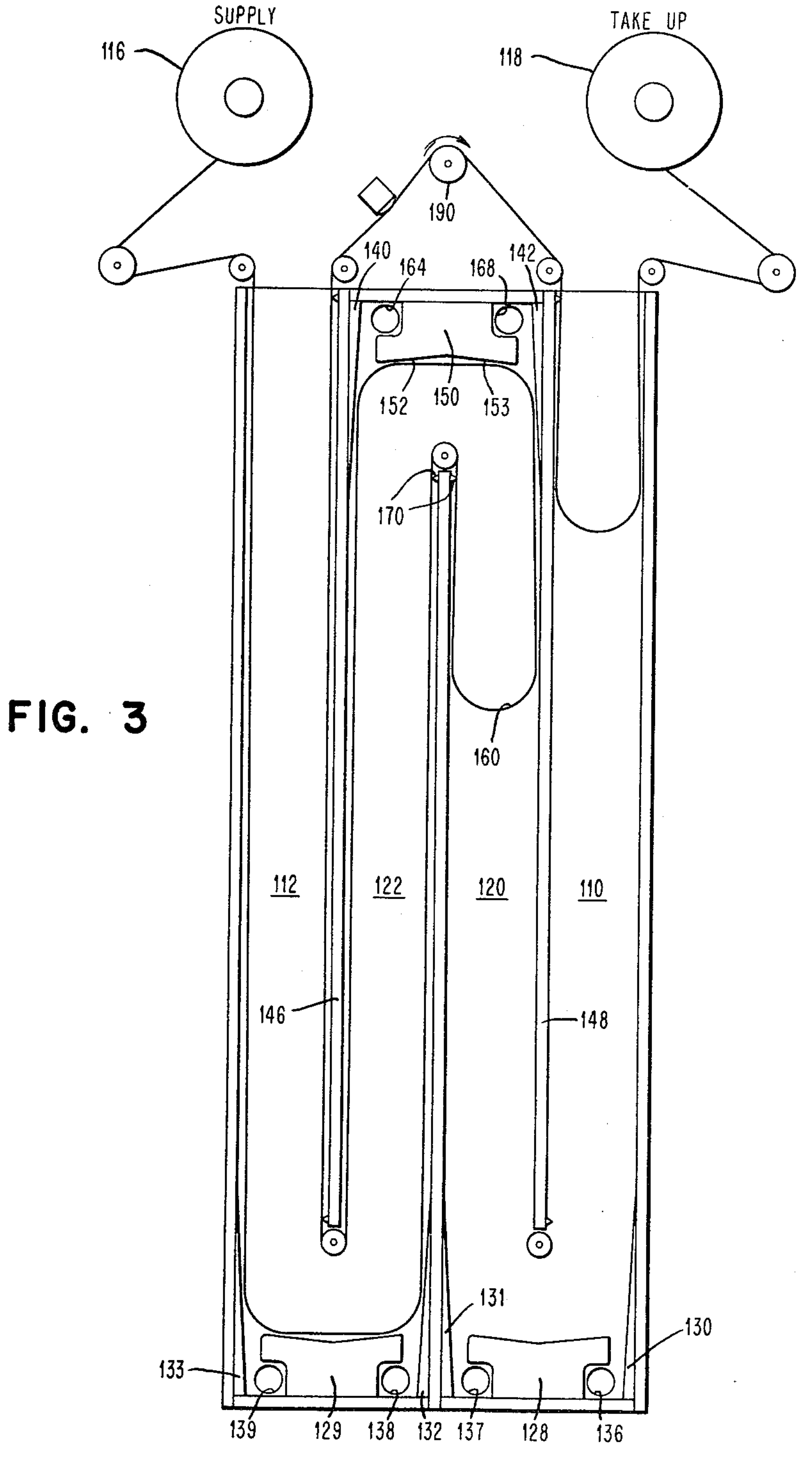
FIGURE 3 is a complete view of still another form of the novel tape storage system in a tape feeding apparatus.

Referring to FIGURE 3, it will be evident that the first vacuum loop box 110 and the first vacuum loop box 112 which are respectively associated with the take-up and the supply reels 118 and 116, respectively, are each similar in construction to the vacuum loop box 22 of FIGURE 1. Likewise, the second loop box associated with each of the above-mentioned first vacuum loop boxes, namely, loop boxes 120 and 122, respectively, are oriented in a similar fashion with respect to the associated loop boxes 110 and 112, just as loop box 24 is oriented to box 22 in FIGURE 1. Likewise, the end walls 128 and 129 along with the wedges 130–133 and the vacuum ports 136–139 function in a similar fashion to that previously described for corresponding wedges 56 and 58, end wall 40 and aperture 50 in FIGURE 1.

FIGURE 3 shows a variation of full tape feeding apparatus of the type which is shown in partial view in FIGURE 1 in that the second vacuum loop boxes 120 and 122 are arranged to have a region in which they communicate so as to allow a tape loop moving beyond the extreme end of one of the second loop boxes 120 and 122 to turn the corner into the other of the second loop boxes in precisely the same fashion as described previously with regard to the 180° turn which is executed with the arrangement in FIGURE 1. More specifically, the wedges 140 and 142 each in conjunction with the associated walls in boxes 122 and 120, respectively, formed by the partitions 146 and 148 form non-planar surfaces maintaining the tape at the proper small angle to the guiding surface of these elements. Likewise, end wall 150 is shaped in a similar fashion to the end walls 128 and 129 to provide by means of the intersecting plane surfaces 152 and 153, a surface which is non-planar overall and which allows for the tape loop 160 to turn the corner, as for example from loop box 122 into loop box 120 as shown, without adhering to any of the guiding surfaces formed by either the side walls, the wedges, or the end wall.

In the area of communication between the second loop boxes 120 and 122, a region between the wedge 140 and the end wall 150 is connected to a source of reduced air pressure at vacuum port 164. Likewise, vacuum port 168 connects a region between wedge 142 and end wall 150 to the reduced air pressure so that the tape loop is not allowed to adhere to the surfaces or to collapse.

It will be evident from the examination of FIGURE 3 that the arrangement shown allows the distribution of tape in the loop box such that one of the loops may occupy as much as three loop boxes, but simultaneously the other may occupy a maximum of one loop box. It should here be pointed out that it will be necessary to maintain at least one vacuum port or in other words one area exposed to a reduced air pressure along the guiding surface between the two loops in order to maintain the loops. With the arrangement shown in FIGURE 3, it is possible to use only four loop boxes to obtain a maximum loop length for the longest loop a length of three loop boxes whereas by using two folded loop arrangements of the type shown in FIGURE 1, the maximum length could only be the length of two loop boxes. The system of FIGURE 3 is thus able to accommodate a greater disparity between the acceleration rates of its capstan and its reels.

It should be noted that in FIGURE 3 the two triangular projections 170 each serve the same function as the triangular projection 44 of FIGURE 1 with the one serving this function when the loop is approaching in one direction and the other serving the same function when the loop approaches in the opposite direction.

The positioning of the loops in the arrangement of FIGURE 3, as shown, may be the optimum position in anticipation of a forward acceleration by the capstan 190 in the direction of the arrow or it may also be considered the optimum distribution of the loops in anticipation of a deceleration from a rotation in the opposite direction; namely, a counterclockwise direction of the capstan 190. As is well known in the art the reverse distribution of the tape loops, namely with the long loop extending from loop box 110 into loop boxes 120 and 122, while the shorter loop extends only part way into box 112, is the distribution which would accommodate deceleration from a clockwise direction or acceleration from a counterclockwise direction of rotation of capstan 190.

The various arrangements of vacuum loop boxes above described may also include means for controlling the motors driving the reels. These means are well known in the art and may include, for example, either photocells or the use of vacuum switches spaced along the path of the loop in the loop box so as to detect the length of the loop disposed therein and to control the rotation of the associated reel accordingly. Of course, with the arrangement of FIGURE 3, a slight modification would be necessary in that the controls for the particular reel motor must respond to the loop detection apparatus in loop boxes 120 and 122 only when the loop stored therein is associated with that particular reel. This with the arrangement shown in FIGURE 3, a detection of the loop length in the box 120 must serve to control the drive for reel 116 whereas those same controls must operate on the drive for reel 118 when the loop in box 120 comes from the box 110. It is thus only necessary to associate loop length detection in the boxes 120 and 122 with the control for proper reel drive by making the control dependent upon the direction from which the loop approaches the second loop boxes.

The embodiments of the invention in which an exclusive property or privilege is claimed are defined as follows:

1. Storage means for buffer lengths of tape in a system for feeding tape between reels comprising separate first loop boxes for each reel for receiving through an open end thereof a separate loop of tape extending between each of said tape reels, and an interposed tape drive means, a separate second loop box associated with each of said first loop boxes and communicating with an end opposite said open end of each of said first loop boxes so as to provide a change in the direction of the associated tape loops as they move from said first loop boxes to said second loop boxes, said second loop boxes directly communicating with each other at their other ends, the region of communication between each of said loop boxes including means for exposing said region to a source of reduced air pressure so that each tape loop is maintained taut as long as the ends of the loops are not in the same loop box.

2. In a tape drive utilizing a capstan to transport tape past a transducer head and having a supply reel and a take-up reel, means for storing lengths of tape between each of said reels and said capstan comprising a first loop box associated with each of said reels for receiving through an open end a looped length of tape, a second loop box communicating with the end opposite the open end of each of said first loop boxes so as to turn said tape loops through 180° as they extend from said first loop boxes into corresponding ones of said second loop boxes, said second loop boxes being arranged to communicate at their ends opposite the ends communicating with said first loop boxes so as to turn a loop extending from either of said second loop boxes into the other, and means for supplying a reduced pressure outside the path of said tape loop at each of said regions of communication between said loop boxes.

3. In a tape transport system comprising a supply reel, a take-up reel and a capstan for transporting the tape between said supply reel and said take-up reel; first loop box means having an opening in one end for receiving a loop of tape between said capstan and said supply reel, second loop box means having an opening in one end for receiving a loop of tape between said capstan and said take-up reel, third loop box means communicating at one end with said first loop box means through an opening in the other end of said first loop box means, fourth loop box means communicating at one end with said second loop box means through an opening in the other end of said second loop box means, said third and fourth loop box means communicating with each other through an opening in the other ends of said third and fourth loop box means, all of said loop box means being in parallel relationship whereby a loop of tape from said capstan and said supply reel may be inserted into said fourth loop box means via said first and third loop box means changing direction twice in so doing.

References Cited by the Examiner

UNITED STATES PATENTS

| | | | |
|---|---|---|---|
| 2,980,355 | 4/61 | Canninga | 242—55.12 |
| 3,091,409 | 5/63 | Goodale | 226—97 X |

ROBERT B. REEVES, *Acting Primary Examiner.*

ANDRES H. NIELSEN, RAPHAEL M. LUPO, SAMUEL F. COLEMAN, *Examiners.*